Jan. 27, 1959   B. B. CRAVENS   2,870,801
COLUMN CONSTRUCTION AND ADJUSTMENT FOR A RADIAL SAW
Filed April 15, 1955   4 Sheets-Sheet 2
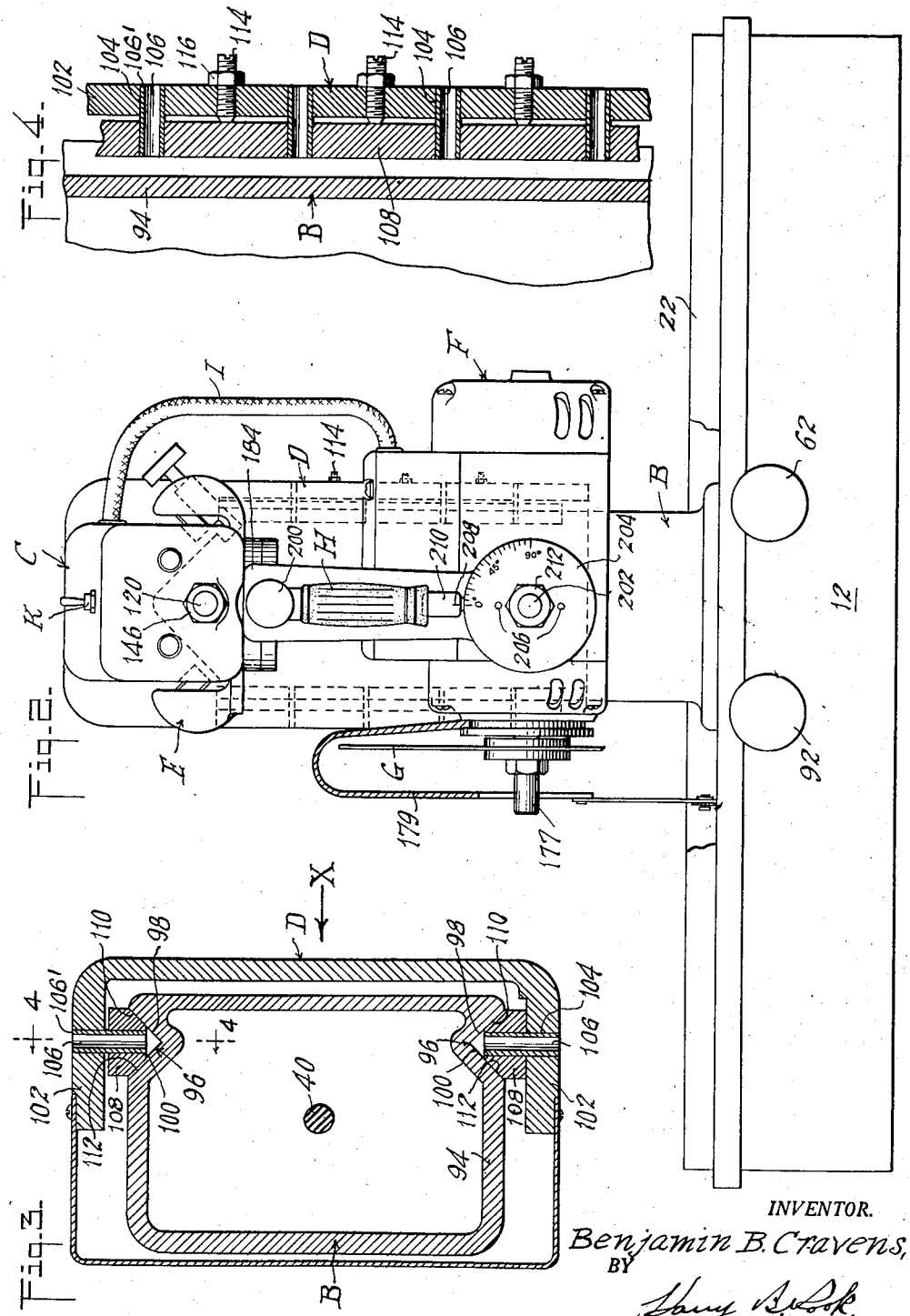
INVENTOR.
Benjamin B. Cravens,
BY
ATTORNEY

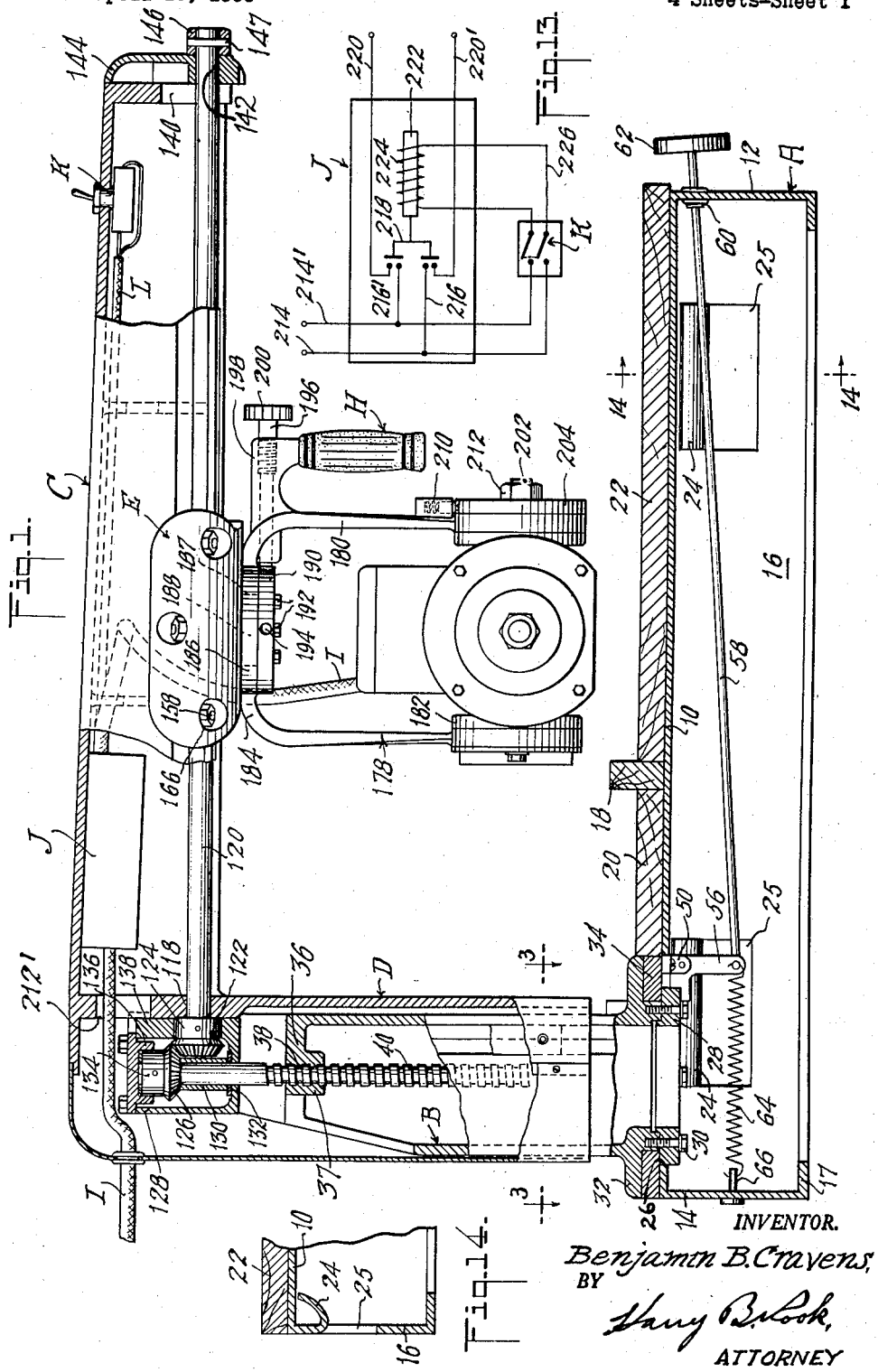

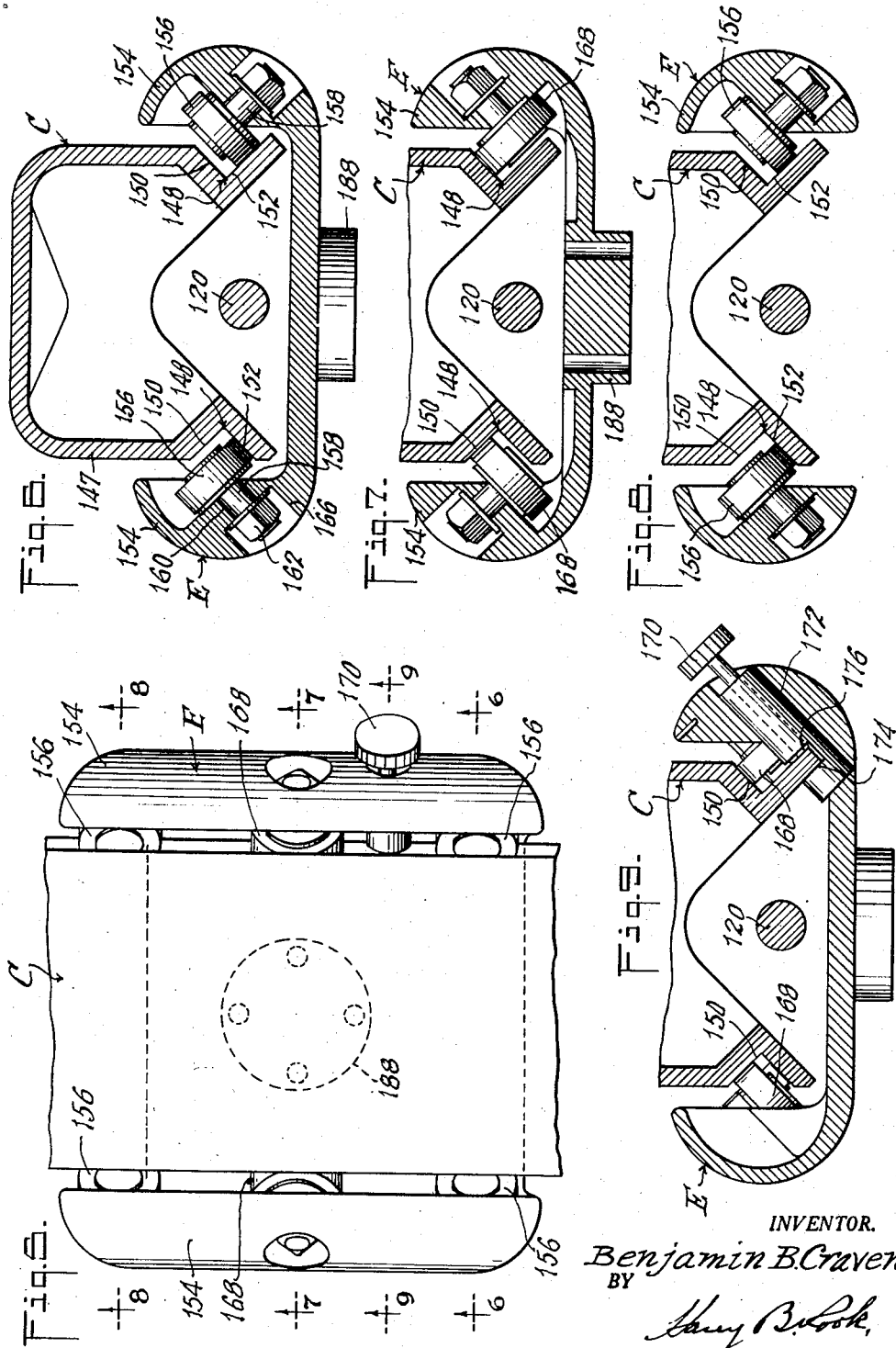

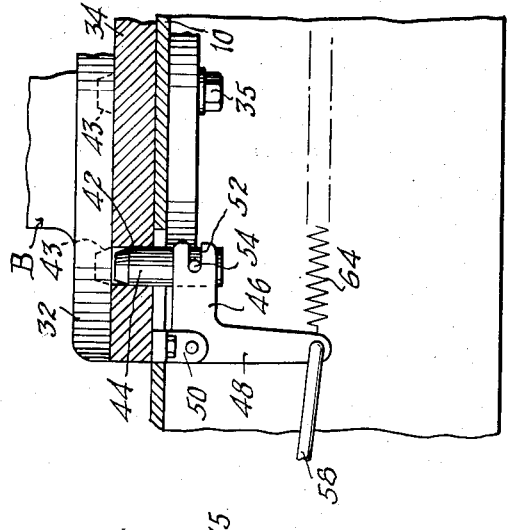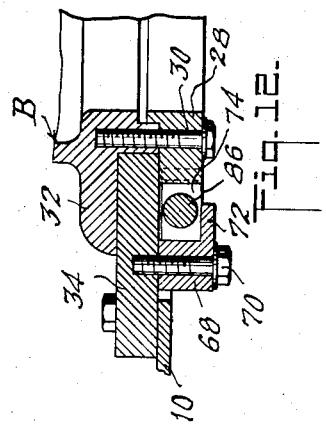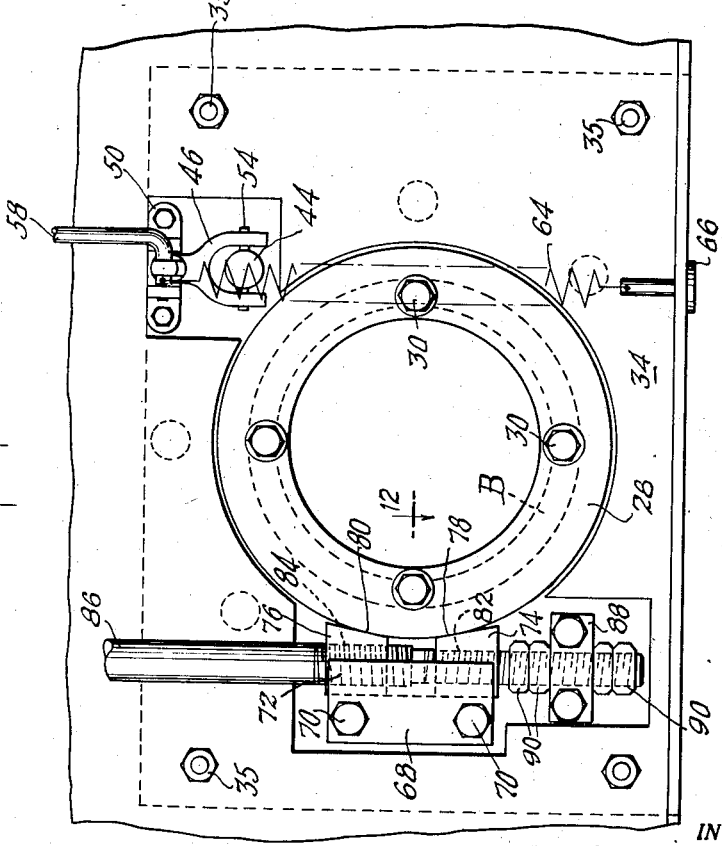

United States Patent Office 2,870,801
Patented Jan. 27, 1959

2,870,801

COLUMN CONSTRUCTION AND ADJUSTMENT FOR A RADIAL SAW

Benjamin B. Cravens, Livingston, N. J.

Application April 15, 1955, Serial No. 501,659

4 Claims. (Cl. 143—6)

The invention relates to machine tools of the type including a radial arm upon which a carriage having a cutting tool, such as a circular saw, is mounted for reciprocation along the arm, the arm being rotatable or swingable about a vertical axis and movable toward and away from the working surface of the machine. More particularly, the invention relates to a portable radial saw constructed to meet the demands of the growing "Do It Yourself" market, where price, as well as simplicity of operation, are important factors.

An object of the invention is to provide a radial saw, which, though sufficiently inexpensive and simple to meet the "Do It Yourself" market, is of rugged and durable construction.

Another object of the invention is to mount the radial arm in a manner to enable the machine to withstand undue shock which may be caused when the cutting tool engages a resistant object.

A further object of the invention is to provide simplified means for raising and lowering the radial arm, and for rotating and locking the arm in desired position.

Still a further object of the invention is to provide an improved machine wherein all the controls for indexing or moving the various parts, and locking such parts in desired position, is accomplished from the front of the machine for the purposes of safety and accessibility.

Still a further object of the invention is to provide improved means for manually grasping and moving the machine.

Other objects, advantages and results of the invention will be brought out by the following description in conjunction with the accompanying drawings, in which:

Fig. 1 is a side elevational view, partly in section, and partly broken away, of a machine tool embodying my invention;

Fig. 2 is a front elevational view of the machine;

Fig. 3 is a horizontal cross-sectional view taken approximately in the plane of line 3—3 of Fig. 1;

Fig. 4 is a vertical cross-sectional view taken approximately in the plane of line 4—4 of Fig. 3;

Fig. 5 is a top plan view of a carriage suspended from the radial arm of the machine;

Fig. 6 is a partial vertical cross-sectional view taken approximately in the plane of line 6—6 of Fig. 5;

Fig. 7 is a partial vertical cross-sectional view taken approximately in the plane of line 7—7 of Fig. 5;

Fig. 8 is a partial vertical cross-sectional view taken approximately in the plane of line 8—8 of Fig. 5;

Fig. 9 is a partial vertical cross-sectional view taken approximately in the plane of line 9—9 of Fig. 5;

Fig. 10 is a bottom plan view of the mechanism for rotatably indexing and locking the column and radial arm;

Fig. 11 is a side elevational view, partly in section, of the column indexing means;

Fig. 12 is a vertical cross-sectional view taken approximately in the plane of line 12—12 of Fig. 10;

Fig. 13 (sheet 1) is a circuit diagram of the relay for controlling the motor suspended from the radial arm of the machine; and Fig. 14 is a vertical cross-sectional view taken approximately in the plane of line 14—14 of Fig. 1.

Generally, and as shown in Figs. 1 and 2, the machine tool of the present invention comprises a bed or base frame A at the rear of which, and centrally, is rotatably mounted a vertically disposed column B. A radial arm C, which extends horizontally over the base frame, is connected to the column B by a downwardly extending channel D. The channel D, and with it the radial arm C, is connected to the column B for vertical movement with respect thereto and rotation therewith. A carriage E, from which is suspended a motor F and a directly connected cutting tool, such as a circular saw G, is mounted for reciprocation along the radial arm C by grasping and moving a handle H. The motor and saw are suspended from the carriage in a manner to permit them to be swiveled or rotated about a vertical axis as a unit. Also, the motor and saw are mounted for angular adjustment about a horizontal axis parallel to the length of the radial arm. The motor is connected to a suitable source of power by a cable I, in the line of which a relay J is located, the relay being actuated by a switch K through a relay control cable L.

The means for moving or indexing the various elements each have a corresponding locking means to maintain the element in desired position. As will subsequently be described in detail, the indexing and locking of the parts are simply and effectively accomplished by controls located in the front of the machine for facility of operation and for purposes of safety.

In greater detail, and referring more particularly to Fig. 1, the machine is mounted on a work-supporting or base frame A, which is preferably made of sheet metal and has a top surface 10, a front wall 12, rear wall 14, and side walls 16. The base frame is substantially open at the bottom except for the inturned ends 17. A wooden guide block or fence 18 may be located in desired position on the top surface between the work table or machine bed members 20 and 22.

The machine tool of the present invention is of the portable type, and as shown in Figs. 1 and 14, the side walls 16 of the base frame are provided with improved integrally formed hand-grips 24. The hand-grip is formed by shearing the sheet metal at the bottom and sides, leaving the top connected to form a tongue, and displacing the tongue inwardly and arcuately upward to thereby provide an opening 25 to allow the hand to be inserted and grasp the upwardly curved and hand-conforming tongue. The shearing and forming of the hand-grip may be accomplished in a single stamping and forming operation.

As shown in Fig. 1, at the rear of the base frame A, and centrally thereof adjacent the rear wall 14, the top surface 10 is provided with a hole or aperture 26. A column lock ring or collar 28 is received within the aperture 26 and is secured to the lower end of column B for rotation therewith by the bolts 30. The column B is hollow and has a laterally extending outer flange 32 near its lower end. A column base plate 34 is located between the top surface 10 of the bed frame and the flange 32, and is fixed to the top surface by bolts 35, Figs. 10 and 11. Thus, the column lock collar and the column are rotatable with respect to the column base plate. The column B is provided with a fixed nut 36 at its upper end. Preferably, the nut is formed by making the column with an integral cross-web having a thickened central portion 37 which is internally threaded at 38 to receive a long, vertically extending screw 40, for a purpose to be subsequently described.

As shown in Figs. 1, 10 and 11, to index or locate the rotatable column B in desired position, and with it the radial arm C, the column base plate 34 is provided with apertures 42 extending vertically therethrough. The column flange 32 has aligned indentations 43. An index pin 44 is adapted to be received within the apertures 42 and the indentations 43. The index pin is mounted for vertical movement at the end of an arm 46 of a bell crank lever 48. The bell crank is fulcrumed on a bracket 50 bolted to the column base plate. The lever arm 46 is bifurcated and slotted at its end 52 to receive a cross-pin 54 passing through the index pin 44. The other arm 56 of the bell crank is connected at its lower end to a substantially horizontally extending handle 58 which passes through a bearing 60 in the front wall 12 of the bed frame, Fig. 1, and terminates in a circular knob 62. Also connected to the end of the lever arm 56, but extending in the opposite direction, is a tension spring 64, the other end of which is anchored to the shank of a headed bolt 66, the shank passing through the rear wall 14.

As shown in Figs. 10 and 12, the column base plate 34 has secured thereto a column lock bracket 68 by the bolts 70. The bracket 68 has a laterally extending flange 72 upon which are slidably seated a pair of spaced locking shoes 74 and 76 having collar engaging faces 78 and 80, respectively. The collar engaging faces are angled to converge towards each other in order to give greater surface engagement with, and a wedging action against, the periphery of the column lock collar. The lock shoes 74 and 76 are internally threaded at 82 and 84, respectively, with the former having a left hand and the latter a right hand thread. A long lock screw 86, which need only be threaded at its working end, is received within the internally threaded apertures of the lock shoes with its extreme end passing through an internally threaded block 88, which is also fixed or bolted to the base plate. The screw 86 is threaded through jam nuts 90 located on each side of the block 88. The lock screw 86 extends to the front of the machine and through the front wall 12 where it terminates in a circular knob 92, as shown in Fig. 2.

To rotatably index and lock the column B, or in effect the radial arm C which is mounted for direct rotation therewith, the knob 92 is first turned to the unlocked position. The knob 62 is pulled against the tension provided by the spring 64, whereby the indexing pin 44 is withdrawn from a base plate aperture 42 and a column indentation 43. The column B and the column lock collar 28 can now be rotated, and this is accomplished by swinging the radial arm to desired position. Upon releasing tension on the knob 62, the indexing pin moves up into an aperture and indentation. The knob 92 is then turned towards locking position, which causes the lock shoes 74 and 76 to move towards each other, exert pressure and wedge against the periphery of the column lock collar 28, thereby locking the column against rotation.

Referring to Figs. 1, 3 and 4, the radial arm C and its depending channel D is preferably formed as a single casting. The depending channel portion of the casting is connected to the column B for relative movement with respect thereto in a vertical direction only. The column is provided at its side walls 94 with vertically extending ways 96 of substantially V-shape with surfaces 98 and 100 approximately 90° with respect to each other. The channel D has side walls 102 which are parallel to and spaced from the sides 94 of the column B. The channel side walls are each provided with a series of apertures 104 in which substantially cylindrical, hollow, longitudinally slotted spring pins 106 are frictionally received. The top ends 108 of the pins are flush with the outer surface of the channel sides. The pins 106 extend beyond the inner surface of each channel side wall and pass through drilled holes to support gibbs 108. The gibbs are provided with chamfered surfaces 110 and 112 for engagement with the surfaces 98 and 100, respectively, of the ways 96. As shown in Fig. 4, to adjust the pressure of the gibbs within the ways, screws 114 are threaded through the side wall of the channel D and have their ends engage the gibbs. The adjusting pressure screws are located intermediate the spring pins 106, and are provided with lock nuts 116 to maintain the resiliently mounted gibbs in desired pressure engagement within the ways. Through this resiliency any abnormal shocks or stresses on the radial arm, saw or cutters are absorbed by the pins and thus prevented from being transmitted to the column in such a way as to disturb the perpendicular relationship of the column to the base frame.

The foregoing structure affords a resilient, yet strong connection between the column C and the channel D, while allowing relative movement in a vertical direction. If any undue force is applied in the direction of the arrow x, Fig. 3, as when the saw G strikes a knot in a piece of wood, the force is transmitted through the resilient pins and largely absorbed or dissipated, because of the angularity, approximately 45°, of the slidably engaging surfaces 98 and 110, and 100 and 112 with respect to the direction of the force. In this manner, shock is effectively absorbed and dissipated to prevent damage from being done to the column, the screw passing therethrough and through the described column indexing and locking mechanism.

As shown in Fig. 1, the casting comprising the radial arm C and its depending channel D is provided with an opening 118 which serves as a bearing for the rear end of a long shaft 120. A bevel gear 122 has its hub 124 securely fastened to the extreme rear end of the shaft, the gear being in meshing engagement with a bevel gear 126 secured to the upper end of the vertically extending screw 40. The gears are suitably enclosed in a gear housing 128, and to assure that the teeth of the bevel gears are always in engagement with each other, the top of the screw 40 is enclosed in a sleeve 130 having a flange 132 bearing against the bottom of the gear housing. The bevel gear 126 has its hub 134 confined between the depending flanges 136, and the hub 124 of the gear 122 is similarly prevented from movement, other than rotation, by the block 138. The shaft 120 extends the entire length of the radial arm C to the very front thereof. It passes through an aperture 140 in the front of the arm, and through an aperture 142 in a bracket 144 terminating in a suitable polyhedral nut 146. A cross-pin 147 connects the nut to the shaft and assures that turning the nut will rotate the shaft.

To raise or lower the radial arm C, a crank is placed over the nut 146 and turned, whereupon the shaft 120 is rotated, causing the bevel gear 122 to rotate the bevel gear 126 fixedly secured to the top of screw 40. As a result, the radial arm C is moved up or down with respect to the column B, the nut 36 through which the screw 40 is threaded being in a fixed horizontal plane. The making of this adjustment is probably the most frequent of any action of the operator and requires the operator to stand back away from the danger zone around the saw and to place both hands in safe positions. In making the adjustment, obviously one hand must be placed on the crank, and naturally the other hand is placed on the end portion of the radial arm.

Referring to Figs. 1 and 5 to 9, the radial arm C, which is in the form of a hollow substantially inverted U-shaped channel, is provided at its sides 147 with horizontally extending ways or tracks 148 of substantially V-shape, with the upper surface 150 substantially at a right angle to the lower surface 152. The carriage E is substantially U-shaped with its side walls 154 spaced farther apart than, and parallel to, the side walls 147 of the radial arm. A series of spaced rollers alternately engaging the upper and lower surfaces 150 and 152 of the tracks 148 permit the carriage to be reciprocated along the radial arm. As shown in Figs. 6 and 8, rollers 156 engage the surfaces 152 of the tracks, the rollers being provided with pins 158 passing through apertures 160 in the side walls 154. The pins 158 are screw-threaded at the top to receive lock nuts 162 which bear against washers 164 seated against the surfaces adjacent the openings 160 in counterbore openings 166. As shown in Figs. 7 and 9, a similar arrangement is provided, except that the rollers, designated 168, engage the upper sides 150 of the track 148. Also, as shown in Fig. 9, the carriage may be locked in any position along the length of the radial arm by means of a set screw 170 threaded through a bracket 172 provided with a shoulder 174 abutting the bottom side of the track 148. The set screw has its bearing end 176 engageable with the surface 152 of the track.

Referring to Figs. 1 and 2, the motor F and the circular saw G, directly connected on the motor shaft 177, are suspended from the carriage E by a yoke 178 in a manner which permits the motor and saw to be rotated or swiveled as a unit about a vertical axis. The saw may be partially covered with a guard 179. The yoke comprises downwardly extending spaced arms 180 to the lower ends of which are secured end plates 182 of a bracket for holding the motor. The upper inturned horizontally disposed ends 184 of the arms are received within a swivel plate 186 having a central aperture 187 through which a circular boss 188 extends down from the carriage, as also shown in Fig. 7. A circular holding plate 190 is fixedly fastened by bolts 192 to the boss 188 in a manner which frictionally supports the swivel plate while allowing it to rotate. Notches or indentations 194 are formed in the side of the holding plate which are adapted to receive the end of a threaded locking pin 196. The locking pin extends through the horizontally extending portion 198 of the handle H. The pin has a circular knurled head 200 to facilitate turning.

With the end of the pin withdrawn from a notch 194, the yoke, and the motor and saw which it supports, is rotated beneath the carriage by grasping the handle H and turning in a horizontal plane. When the saw is in desired position, and with the locking pin in alignment with another notch, the head 200 is turned to seat the end of the locking pin within the notch, whereupon the saw is now locked in position.

As shown in Fig. 2, the motor and the directly connected circular saw may be rotated as a unit about a horizontal axis provided by threaded bolt 202. The bolt passes through the lower end of a yoke arm 180 and is directly fastened to an end plate 182 of the bracket holding the motor. The end plate is rotatable with respect to the yoke arm with which it is in contact. On the outer side of the yoke arm, a dial plate 204 is fastened to the bolt. The dial plate has roll pins 206 fixed to its face to enable the plate to be turned. The dial plate has imprinted thereon a scale of degrees for matching up with a datum line 208 on a plunger 210 secured to a yoke arm 180. A lock nut 212 threaded on the end of the bolt 202 when unscrewed permits the dial plate, and with it the motor and saw, to be rotated. When the desired degree of angularity is obtained, the lock nut is tightened.

Power is supplied to the motor through cable I, which passes through an opening 212 in the rear of the radial arm C, along the arm and then downwardly to the motor F. A motor control relay J is located in the line and its housing is fastened to the underside of the radial arm. The relay is actuated from a switch K, preferably of the toggle type, through a relay control cable L. The switch is located at the front and top of the radial arm for easy accessibility.

As shown in Fig. 13, the conductors 214, 214' of the power cable I are connected to the switch K, with leads 216, 216' connected to the terminals of a relay power switch 218, the switch also having terminals to which conductors 220, 220' are connected and lead to the motor. The relay power switch includes a spring biased actuator 222 about which a coil 224 is wound, the coil constituting a conductor 226 having its ends connected to the terminals of the switch K. When the switch K is turned to "on," current is induced in the actuator 222 causing it to move to the left and close the relay power switch 218, thereby connecting the power line conductors 214, 214' to the motor line conductors 220, 220'. When the switch K is turned to "off," the actuator 222 moves to the right, breaking the connection at the switch 218.

It is believed that the advantages and improvements of my radial saw will be apparent from the foregoing description. All controls for imparting movement to the various parts of the machine and locking them in desired position are located at the front of the machine. The operator does not have to lean over the machine to actuate any of the controls and thereby increase the possibility of injury if the saw is under power. Notwithstanding the simplicity and comparatively low cost of manufacture, the machine is ruggedly constructed. The described mounting of the radial arm on the column is especially advantageous in imparting durability to an otherwise light machine. The mechanism for indexing the column and radial arm and locking them in position, as well as the mechanism for raising and lowering the arm are simple, effective and of durable construction. Also, the improved means for grasping and lifting the entire machine lessens the cost of manufacture. These, and other advantages will be apparent from the foregoing detailed description. It will also be apparent that while the invention has been shown and described in its preferred form, changes may be made in the structure disclosed without departing from the scope of the invention, as sought to be defined in the following claims.

I claim:

1. A machine tool of the type including a radial arm upon which a carriage having a cutting tool suspended therefrom is mounted for reciprocation along the arm, said machine tool comprising a base frame, a vertical column rotatably mounted on the frame at the rear thereof, said column having a fixed nut secured thereto, a vertically disposed screw passing through said nut, said screw having a bevel gear secured to its upper end, a radial arm extending over said base frame and connected to said column for rotation therewith by a downwardly extending channel, said channel embracing said column and there being guide means connecting said channel to said column for rotation of the channel and radial arm with said column and for movement of said channel longitudinally of the column to move said radial arm toward and from said base frame, means actuated from the front of the base frame for indexing the column, a column lock collar secured to said column and rotatable therewith, friction elements actuated from the front of the base frame and movable into and out of pressure frictional engagement with the circumferential surface of said collar, and a shaft extending horizontally through said radial arm and having a beveled gear secured to the rear end thereof in meshing engagement with said beveled gear on said screw, one end of said shaft projecting from the front end of said radial arm and having means on said projecting end for rotating the shaft, whereby upon turning said shaft the radial arm is raised or lowered with respect to said base frame, all of said column indexing means, column locking means and the raising and lowering means for said radial arm being operable by control means in front of the zone in which the cutting operations are performed by the cutting tool.

2. A machine tool of the type defined in claim 1 wherein said friction elements comprise a pair of spaced locking shoes slidably mounted on said base frame at opposite sides of said lock collar and having oppositely threaded openings in which is threaded a screw that extends to the front of the base frame, thereby permitting actuation of the screw from the front of the machine to move said locking shoes into and out of frictional engagement with said lock collar.

3. A machine tool of the type defined in claim 1 having a machine bed on said base frame and wherein said radial arm has a substantially V-shaped track extending along each outer side thereof with both surfaces of said V-shaped track angularly disposed to the plane of the machine bed, said carriage being mounted on said arm by a plurality of rollers received in said tracks and spaced longitudinally thereof, adjacent rollers on each side of the radial arm engaging opposite sides of the corresponding V-shaped track.

4. A machine tool comprising a base frame, a vertical column mounted on said frame and having a substantially V-shaped guideway on each side thereof, a radial arm extending over said base frame and having a downwardly extending channel embracing said column, gibbs having chamfered surfaces engaging the angled sides of said guideways and mounted solely on split tubular spring pins secured to said channel so that shocks and stresses imposed on said radial arm and channel will be absorbed by said spring pins and thus prevented from being transmitted to the column, and means for moving said channel and the arm connected thereto vertically on said column.

References Cited in the file of this patent

UNITED STATES PATENTS

| Number | Name | Date |
|---|---|---|
| 676,987 | Langbein | June 25, 1901 |
| 1,285,628 | Craley | Nov. 26, 1918 |
| 1,499,412 | Sears et al. | July 1, 1924 |
| 1,601,610 | Carter | Sept. 28, 1926 |
| 1,735,990 | Belnap | Nov. 19, 1929 |
| 2,104,299 | Grundstein | Jan. 4, 1938 |
| 2,291,999 | Wilson et al. | Aug. 4, 1942 |
| 2,312,356 | Ocenasek | Mar. 2, 1943 |
| 2,418,639 | Horman | Apr. 8, 1947 |
| 2,459,921 | Comer | Jan. 25, 1949 |
| 2,584,863 | Gesner | Feb. 5, 1952 |
| 2,611,398 | Schutz | Sept. 23, 1952 |
| 2,628,643 | Tompkins | Feb. 17, 1953 |
| 2,719,761 | Bonnafe | Oct. 4, 1955 |
| 2,738,625 | Strnad | Mar. 20, 1956 |

FOREIGN PATENTS

| Number | Country | Date |
|---|---|---|
| 667,977 | Great Britain | Mar. 12, 1952 |